(12) United States Patent
Ikegami (10) Patent No.: US 8,242,882 B2
(45) Date of Patent: Aug. 14, 2012

(54) BIOMETRIC AUTHENTICATION APPARATUS AND BIOMETRIC AUTHENTICATION CONTROL METHOD

(75) Inventor: Jun Ikegami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 610 days.

(21) Appl. No.: 12/461,383

(22) Filed: Aug. 10, 2009

(65) Prior Publication Data

US 2010/0060411 A1 Mar. 11, 2010

(30) Foreign Application Priority Data

Sep. 5, 2008 (JP) ................. 2008-228193

(51) Int. Cl.
*G05B 19/00* (2006.01)
*G05B 23/00* (2006.01)
*G06K 9/00* (2006.01)

(52) U.S. Cl. ...... 340/5.53; 382/116; 382/124; 340/5.82; 340/5.8

(58) Field of Classification Search ........................ None
See application file for complete search history.

(56) References Cited

U.S. PATENT DOCUMENTS

| | | | | |
|---|---|---|---|---|
| 5,229,764 | A * | 7/1993 | Matchett et al. ............. | 340/5.52 |
| 6,259,805 | B1 * | 7/2001 | Freedman et al. ............. | 382/124 |
| 6,434,259 | B1 * | 8/2002 | Hamid et al. ................. | 382/115 |
| 6,731,779 | B2 * | 5/2004 | Satoh ............................ | 382/124 |
| 7,088,220 | B2 * | 8/2006 | Kotzin ......................... | 340/5.82 |
| 2002/0138743 | A1 * | 9/2002 | Murakami et al. ............ | 713/186 |
| 2006/0018515 | A1 * | 1/2006 | Itoh et al. ...................... | 382/115 |
| 2007/0177766 | A1 * | 8/2007 | Kasahara et al. ............. | 382/115 |
| 2008/0192989 | A1 * | 8/2008 | Asano et al. .................. | 382/115 |
| 2009/0110249 | A1 * | 4/2009 | Miura et al. .................. | 382/124 |

FOREIGN PATENT DOCUMENTS

JP 2007-122529 5/2007

* cited by examiner

*Primary Examiner* — George Bugg
*Assistant Examiner* — Renee Dorsey
(74) *Attorney, Agent, or Firm* — Staas & Halsey LLP (57) ABSTRACT

A biometric authentication apparatus includes a part to retain first biometric data items extracted from living body parts of a user in correlation with the collation order of the first biometric data items; a part to acquire a second biometric data item from the user, to compare and collate the acquired second biometric data item with the first biometric data items in descending order of their collation priorities based on the collation order, and to determine that the user has been successfully authenticated in response to detecting one of the first biometric data items whose match rate with the second biometric data item exceeds a predetermined value; and a part to change the collation order in response to detecting, from the state of usage of the one of the first biometric data items, that the user has steadied at a change of her/his living body part to use for authentication.

19 Claims, 6 Drawing Sheets

| ID | REFERENCE DATA | NUMBER OF TIMES USED | NUMBER OF TIMES USED IN SUCCESSION | COLLATION ORDER | COLLATION ORDER CHANGE DATE | ... |
|---|---|---|---|---|---|---|
| MORGAN | DATA #1 | 153 | 0 | 2 | XX/XX/XX | ... |
| | DATA #2 | 324 | 8 | 1 | XX/XX/XX | ... |
| | DATA #3 | 5 | 0 | 3 | XX/XX/XX | ... |
| | DATA #4 | 0 | 0 | 0 | XX/XX/XX | ... |
| | DATA #5 | 0 | 0 | 0 | XX/XX/XX | ... |
| REID | DATA #1 | 210 | 9 | 1 | XX/XX/XX | ... |
| | DATA #2 | 56 | 0 | 3 | XX/XX/XX | ... |
| | DATA #3 | 32 | 0 | 2 | XX/XX/XX | ... |
| | DATA #4 | 0 | 0 | 0 | XX/XX/XX | ... |
| | DATA #5 | 0 | 0 | 0 | XX/XX/XX | ... |
| GARCIA | DATA #1 | 421 | 9 | 1 | XX/XX/XX | ... |
| | DATA #2 | 210 | 0 | 2 | XX/XX/XX | ... |
| | DATA #3 | 10 | 0 | 3 | XX/XX/XX | ... |
| | DATA #4 | 0 | 0 | 0 | XX/XX/XX | ... |
| | DATA #5 | 0 | 0 | 0 | XX/XX/XX | ... |
| ... | ... | | | | ... | |

| ID | REFERENCE DATA | NUMBER OF TIMES USED IN SUCCESSION #1 (07:00-10:00) | COLLATION ORDER #1 (07:00-10:00) | COLLATION ORDER CHANGE DATE #1 | NUMBER OF TIMES USED IN SUCCESSION #2 (10:01-16:59) (19:01-06:59) | COLLATION ORDER #2 (10:01-16:59) (19:01-06:59) | COLLATION ORDER CHANGE DATE #2 | NUMBER OF TIMES USED IN SUCCESSION #3 (17:00-19:00) | COLLATION ORDER #3 (17:00-19:00) | COLLATION ORDER CHANGE DATE #3 |
|---|---|---|---|---|---|---|---|---|---|---|
| MORGAN | DATA #1 | 0 | 2 | XX/XX/XX | 0 | 4 | XX/XX/XX | 7 | 1 | XX/XX/XX |
|  | DATA #2 | 8 | 1 | XX/XX/XX | 0 | 3 | XX/XX/XX | 0 | 2 | XX/XX/XX |
|  | DATA #3 | 0 | 3 | XX/XX/XX | 0 | 2 | XX/XX/XX | 0 | 3 | XX/XX/XX |
|  | DATA #4 | 0 | 0 | XX/XX/XX | 9 | 1 | XX/XX/XX | 0 | 0 | XX/XX/XX |
|  | DATA #5 | 0 | 0 | XX/XX/XX | 0 | 0 | XX/XX/XX | 0 | 0 | XX/XX/XX |
| REID | DATA #1 | 9 | 1 | XX/XX/XX | 9 | 1 | XX/XX/XX | 9 | 1 | XX/XX/XX |
|  | DATA #2 | 0 | 3 | XX/XX/XX | 0 | 3 | XX/XX/XX | 0 | 3 | XX/XX/XX |
|  | DATA #3 | 0 | 2 | XX/XX/XX | 0 | 2 | XX/XX/XX | 0 | 2 | XX/XX/XX |
|  | DATA #4 | 0 | 0 | XX/XX/XX | 0 | 0 | XX/XX/XX | 0 | 0 | XX/XX/XX |
|  | DATA #5 | 0 | 0 | XX/XX/XX | 0 | 0 | XX/XX/XX | 0 | 0 | XX/XX/XX |
| GARCIA | DATA #1 | 9 | 1 | XX/XX/XX | 9 | 1 | XX/XX/XX | 9 | 1 | XX/XX/XX |
|  | DATA #2 | 0 | 2 | XX/XX/XX | 0 | 2 | XX/XX/XX | 0 | 2 | XX/XX/XX |
|  | DATA #3 | 0 | 3 | XX/XX/XX | 0 | 3 | XX/XX/XX | 0 | 3 | XX/XX/XX |
|  | DATA #4 | 0 | 0 | XX/XX/XX | 0 | 0 | XX/XX/XX | 0 | 0 | XX/XX/XX |
|  | DATA #5 | 0 | 0 | XX/XX/XX | 0 | 0 | XX/XX/XX | 0 | 0 | XX/XX/XX |
| .. | .. | .. | .. | .. | .. | .. | .. | .. | .. | .. |

BIOMETRIC AUTHENTICATION APPARATUS AND BIOMETRIC AUTHENTICATION CONTROL METHOD

CROSS-REFERENCE TO RELATED APPLICATION

The present application is based upon and claims the benefit of priority of the prior Japanese Patent Application No. 2008-228193, filed on Sep. 5, 2008, the entire contents of which are incorporated herein by reference.

FIELD

A certain aspect of the embodiment discussed herein is related to human authentication techniques using biometric information (biometric data) such as fingerprints, finger veins, palm veins, and an iris.

BACKGROUND

Biometric authentication systems that perform human authentication using biometric data are used in various situations. In the following, a description is given based on, for example, a client/server system where biometric data are acquired on the client side and biometric data for reference are retained and collation is performed on the server side at the time of authentication. However, this does not exclude, as an object of application, a stand-alone system where biometric data are acquired and collated in a single apparatus. Further, a description is given based on, for example, a system where a user specifies her/his identifier (ID) and collation is performed with one or more biometric data items for reference identified by the user's ID at the time of authentication. However, this does not exclude, as an object of application, a system where collation is performed with a group of candidate biometric data for reference without specification of an ID by a user.

In this type of biometric authentication system, a user pre-registers her/his biometric data obtained from a specific part of her/his living body with the database of a server for reference purposes. At this point, it is recommended that biometric data taken not from a single part but from two or more parts of the living body be registered so that even if a part of the living body usually used for authentication is hurt and not usable, authentication may be performed with another part of the living body. For example, with respect to an iris, biometric data taken from the right and left eyes are registered as data. With respect to palm veins, biometric data taken from the right and left hands are registered as data. In the case of fingerprints or finger veins, an extra finger may be registered in addition to a finger usually used or all fingers (ten fingers) may be registered so that any finger may be used.

Thus, registration of the biometric data of living body parts other than that usually used allows a user to be authenticated by using another registered living body part even if the living body part usually used for authentication is hurt. Further, by thus registering multiple biometric data items, authentication may be performed with any finger in the case of fingerprints, for example, thus producing an advantage in terms of convenience as well.

However, on the server side where authentication is processed, the biometric data item entered by a person for collation is collated with all the registered biometric data items of the person as long as a part to be used is not clearly specified. In this case, practically, the relationship between an entered item and corresponding processing on the server side is not 1:1 but 1:2 or more even if collation is performed with the person specified with her/his ID. In the case of a fingerprint authentication system that recommends registration of ten fingers, this ratio is 1:10.

Time for this processing is not so conspicuous if a biometric authentication algorithm that enables high-speed processing is employed. For example, if a biometric authentication algorithm is employed that processes one collation at high speed in 1 ms (0.001 s), execution of 1:10 processing does not cause much trouble because the time required for collating one person is 10 ms. Nowadays, however, the number of systems operating on a large scale with tens or hundreds of thousands of people to be processed is also increasing. In such systems, all system users may be subjected to personal authentication substantially at the same time at the start of office hours or at the end of a break. In the case of a fingerprint authentication system recommending ten-finger registration, if the system processes ten thousand people, there is a processing time of 10 ms×ten thousand people=100 s (approximately 1.67 minutes) before completion of the entire processing even with a high-speed biometric authentication algorithm that processes one collation in 1 ms as described above. It is possible to reduce processing time by adding a processing server or improving CPU performance. This, however, incurs apparatus expenses. Further, this is also insufficient in performing collation that is unnecessary in nature.

Solutions to such problems include such a technique as disclosed in Japanese Laid-Open Patent Publication No. 2007-122529, which is related to a biometric authentication system used in automated teller machines (ATMs) and the like. According to Japanese Laid-Open Patent Publication No. 2007-122529, the number of successful collations is counted every time biometric information collation is performed, and the order of priorities of multiple prestored biometric information items is changed in accordance with their numbers of successful collations. Thus, multiple biometric information items are prioritized in accordance with their numbers of successes of collation, the biometric information items are subjected to authentication (collation) in order of descending priorities, and a person is authenticated and the processing ends in response to detection of a match. As a result, personal authentication may be performed in a short processing time without performing unnecessary collation.

SUMMARY

According to an aspect of the embodiment, a biometric authentication apparatus includes a data retention part configured to retain a plurality of first biometric data items extracted from a plurality of living body parts of a user to be authenticated in correlation with a collation order of the first biometric data items; a collation part configured to acquire a second biometric data item from the user, to compare and collate the acquired second biometric data item with the first biometric data items in a descending order of collation priorities of the first biometric data items based on the collation order, and to determine that the user has been successfully authenticated in response to detecting one of the first biometric data items whose match rate with the second biometric data item exceeds a predetermined value; and a collation order change part configured to change the collation order in response to detecting, from a state of usage of the one of the first biometric data items used in the successful authentication, that the user has steadied at a change of a living body part thereof to use for authentication.

According to an aspect of the embodiment, a biometric authentication control method includes retaining a plurality of first biometric data items extracted from a plurality of living body parts of a user to be authenticated in correlation with a collation order of the first biometric data items; acquiring a second biometric data item from the user; comparing and collating the acquired second biometric data item with the first biometric data items in a descending order of collation priorities of the first biometric data items based on the collation order; determining that the user has been successfully authenticated in response to detecting one of the first biometric data items whose match rate with the second biometric data item exceeds a predetermined value; and changing the collation order in response to detecting, from a state of usage of the one of the first biometric data items used in the successful authentication, that the user has steadied at a change of a living body part thereof to use for authentication.

The object and advantages of the embodiment will be realized and attained by means of the elements and combinations particularly pointed out in the claims.

It is to be understood that both the foregoing general description and the following detailed description are exemplary and explanatory and not restrictive of the invention, as claimed.

DESCRIPTION OF EMBODIMENT(S)

According to the above-described technique of Japanese Laid-Open Patent Publication No. 2007-122529, top priority is not given to the most recently used biometric information, and priorities may be weighted based on determination as to which living body part is most frequently used.

However, according to a system that counts the number of successes and subjecting living body parts to collation in descending order of their numbers of successes, successes are simply accumulated (the number of successes is simply incremented). Therefore, even if a part to be used for authentication (collation) is changed at some point after using a specific part (such as a specific finger) for a long period of time, the priority of the biometric information that has been used remains the same unless its counted number of successes is exceeded. For example, it is assumed that 1000 successes have been accumulated and counted with an index finger. In this case, even if the finger for authentication is changed to a middle finger for some reason, the biometric information of the index finger is preferentially subjected to authentication (collation) until the number of successes with the middle finger exceeds 1000.

People often repeat the same action for habitual reasons. Therefore, practically, it is often the case that only a particular living body part is used. For example, even a user who have her/his ten fingers registered with a fingerprint authentication system rarely uses multiple fingers for authentication, and tends to keep on using a particular finger. Collation is not performed so many times if such biometric authentication is applied to use of ATMs as in the example application of Japanese Laid-Open Patent Publication No. 2007-122529. However, in such systems as introduced into companies, biometric authentication may be used in various situations such as managing office arrival and leaving, unlocking the screen of a personal computer after returning to a desk, and unlocking a screensaver. In these systems, the frequency of biometric authentication is incomparably higher than that in the case of ATMs, so that the number of times of biometric authentication of a particular user may be several hundred per month.

However, a user may change a part to use for authentication at some point for certain reasons such as the following: It has become difficult to perform authentication with the living body part that has been usually used; a sensor has been relocated; and a finger has been injured. It is assumed that the technique of Japanese Laid-Open Patent Publication No. 2007-122529 is used in these cases. In this case, if the number of successes of the living body part that has been usually used so far is 1000, a new living body part to be used by a user for authentication is not given top priority in collation unless the number of successes of the new living body part becomes 1001. As a result, unnecessary collation with biometric information continues until there is a change in the order of collation priorities, thus preventing high-speed processing.

On the other hand, in stand-alone systems where processing such as acquisition and collation of biometric data is performed in a single apparatus, simultaneous execution of multiple authentication processes is unlikely, but it is often the case that a low-performance CPU is used because of reduction in apparatus cost or a high-speed biometric authentication algorithm cannot be used because of memory resource limitations. Thus, there is also a strong demand for high-speed processing.

According to one aspect of the present invention, there are provided a biometric authentication apparatus and a biometric authentication control method capable of performing high-speed processing even if a user changes a living body part to use for authentication at some point.

A preferred embodiment of the present invention will be explained with reference to accompanying drawings. In the following, a description is given based on, by way of example, a client/server system where biometric data are acquired on the client side and biometric data for reference are retained and collation is performed on the server side at the time of authentication. However, this embodiment may also be applied to a stand-alone system where biometric data are acquired and collated in a single apparatus. Further, a description is given based on, by way of example, a system where a user specifies her/his identifier (ID) and collation is performed with one or more biometric data items for reference identified by the user's ID at the time of authentication. However, this embodiment may also be applied to a system where collation is performed with a group of candidate biometric data for reference without specification of an ID by a user.

[Configuration]

Figure 1:
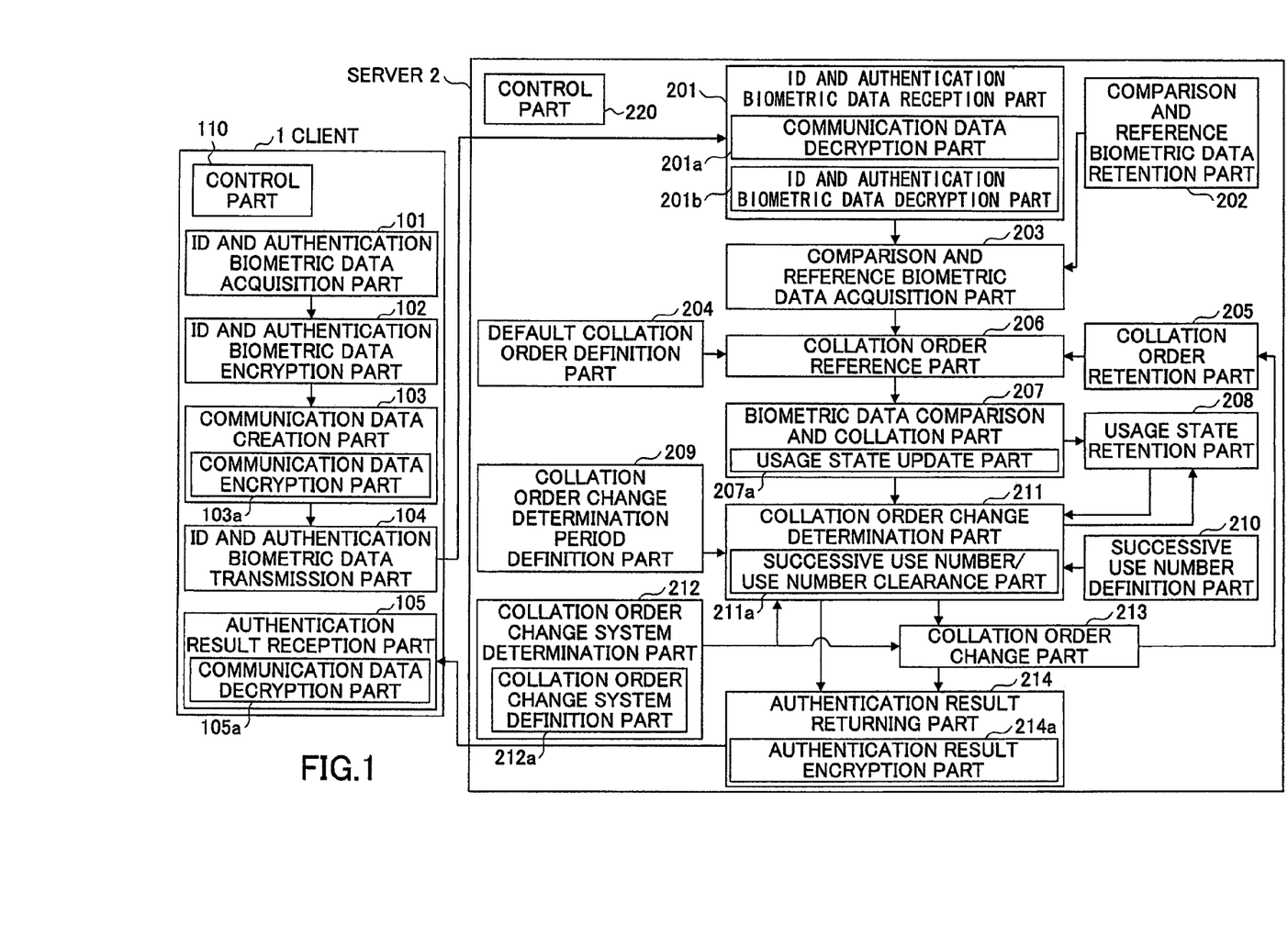
FIG. 1 is a block diagram illustrating a biometric authentication system according to an embodiment.

FIG. 1 is a block diagram illustrating a biometric authentication system according to the embodiment of the present invention.

Referring to FIG. 1, the biometric authentication system includes a client 1 and a server 2. The biometric authentication system may include multiple clients 1 depending on its scale.

The client 1 includes an ID and authentication biometric data acquisition part 101, an ID and authentication biometric data encryption part 102, a communication data creation part 103, an ID and authentication biometric data transmission part 104, and a authentication result reception part (communication data decryption part) 105.

The ID and authentication biometric data acquisition part 101 has the function of acquiring from a user an ID for identifying the user and the user's biometric data for authentication (authentication biometric data) at the time of authentication. The ID may be entered from a keyboard or an ID card, and the authentication biometric data may be acquired by scanning a living body part with a sensor and extracting a feature as required. With respect to the authentication biometric data, the extracted (acquired) image is directly used in the case of performing collation based on image matching. Alternatively, in the case of comparing living body feature points at binary levels, comparable data are created from the extracted image.

The ID and authentication biometric data encryption part 102 has the function of encrypting the ID and authentication biometric data acquired in the ID and authentication biometric data acquisition part 101. Encryption is performed in accordance with a known algorithm such as a hashing algorithm. Encryption is performed in order to prevent cheating such as masquerading as a person by illegally obtaining the person's ID and authentication biometric data from communication data or the like.

The communication data creation part 103 has the function of creating communication data (data to be communicated) to the server 2 including the ID and authentication biometric data encrypted in the ID and authentication biometric data encryption part 102. The communication data creating part 103 includes a communication data encryption part 103*a* configured to encrypt the communication data. It is for increasing security by double encryption that encryption of the communication data is performed in addition to encryption of the ID and authentication biometric data. Accordingly, if security is not so much a problem, one or both of the encryptions may be omitted.

The ID and authentication biometric data transmission part 104 has the function of transmitting the communication data created in the communication data creating part 103 to the server 2.

The authentication result reception part 105 has the function of receiving communication data including an authentication result from the server 2. The authentication result reception part 105 includes a communication data decryption part 105*a* configured to decrypt encrypted communication data received from the server 2. The client 1 further includes a control part 110 such as a processor or a central processing unit (CPU) that implements and controls the operations of the above-described parts 101 through 105 by executing a program installed in the client 1.

The server 2 includes an ID and authentication biometric data reception part 201, a comparison and reference biometric data retention part 202, a comparison and reference biometric data acquisition part 203, a default collation order definition part 204, a collation order retention part 205, a collation order reference part 206, a biometric data comparison and reference part 207, a usage state retention part 208, a collation order change determination period definition part 209, a successive use number definition part 210, a collation order change determination part 211, a collation order change system determination part 212, a collation order change part 213, and an authentication result returning part 214.

The ID and authentication biometric data reception part 201 has the function of receiving communication data including an ID and authentication biometric data from the client 1. The ID and authentication biometric data reception part 201 includes a communication data decryption part 201*a* configured to decrypt encrypted communication data received from the client 1 and an ID and authentication biometric data decryption part 201*b* configured to decrypt an encrypted ID and authentication biometric data included in the decrypted communication data.

The comparison and reference biometric data retention part 202 has the function of retaining biometric data for comparison and reference (comparison and reference biometric data) extracted (acquired) in advance from system users. In particular, the comparison and reference biometric data retention part 202 retains multiple comparison and reference biometric data items extracted from multiple living body parts of users on a user-by-user basis.

The comparison and reference biometric data acquisition part 203 has the function of acquiring corresponding comparison and reference biometric data (item) from the comparison and reference biometric data retention part 202 using the ID as a key when acquiring the ID and authentication biometric data from the ID and authentication biometric data reception part 201.

The default collation order definition part 204 has the function of retaining a collation order to serve as a default when no valid collation order is set up in the collation order retention part 205 because the system has not been operated for a predetermined period. The default collation order may be determined by an administrator, may be a hard-coded order, or may be the temporal order of registrations by individual users.

The collation order retention part 205 has the function of retaining the collation order of multiple comparison and reference biometric data items extracted from a user's multiple living body parts on a user-by-user basis in accordance with a predetermined collation order change system. The collation order change system changes or updates the order of collation in response to detecting (determining) that a user has steadied at a change of her/his living body part to use for authentication from the comparison and reference biometric data used at the time of successful authentication. Examples of the collation order change system include: (a) changing the place (priority) of the comparison and reference biometric data of a living body part whose number of times used in succession exceeds a predetermined number to first in the collation order on a user-by-user basis (setting the comparison and reference biometric data of a living body part whose number of times used in succession exceeds a predetermined number at the top of the collation order on a user-by-user basis); (b) changing the collation order of comparison and reference biometric data to (rearranging the collation order of comparison and reference biometric data in) descending order of their numbers of times used during a predetermined period on a user-by-user basis on condition that the predetermined period has passed since the last change in the collation order; (c) changing the place (priority) of the comparison and reference biometric data of a living body part whose number of times used in succession during a time (time period) to first in the collation order for the time on a time-by-time and user-by-user basis (setting the comparison and reference biometric data of a living body part whose number of times used in succession during a time (time period) at the top of the collation order for the time on a time-by-time and user-by-user basis); and (d) changing the collation order of comparison and reference biometric data to (rearranging the collation order of comparison and reference biometric data in) descending order of their numbers of times used during a time (time period) in a predetermined period on a time-by-time and user-by-user basis on condition that the predetermined period has passed since the last change in the collation order.

The time-basis management system is effective in the case where clients 1 are installed in multiple usage environments and the same user goes through authentication with different living body parts in different usage environments. That is, a user may go through authentication in more than one usage environment. For example, a user may use a common fixed authentication apparatus at the time of coming to and leaving work or entering and leaving an office or laboratory and use a simple authentication apparatus connected to a personal computer used by the user during work. In such a case, where authentication is performed in multiple usage environments, a user often changes her/his living body part to be used depending on the usage environment. In order to support such a case, it may be desirable to determine the collation order by additionally taking a time (time period) in which authentication has been performed into consideration instead of a uniform way with the number of times used in succession or the number of times used.

The collation order reference part 206 has the function of acquiring a default collation order from the default collation order definition part 204 and acquiring the collation order of multiple comparison and reference biometric data items of a corresponding user from the collation order retention part 205.

The biometric data comparison and reference part 207 has the function of comparing and collating the authentication biometric data (item) of a user acquired from the client 1 in the ID and authentication biometric data reception part 201 with the multiple comparison and reference biometric data items of the user acquired in the comparison and reference biometric data acquisition part 203 in descending order of the collation priorities of the comparison and reference biometric data items acquired in the collation order reference part 206, and determining that the user has been successfully authenticated in response to the match rate exceeding a predetermined value (predetermined match rate). The biometric data comparison and reference part 207 includes a usage state update part 207a configured to update the usage state (such as the number of times used in succession, the number of times used on a period-by-period basis, the number of times used in succession on a time-by-time basis, or the number of times used on a time-by-time and period-by-period basis) retained in the usage state retention part 208 in accordance with the collation order change system.

The usage state retention part 208 retains, in accordance with the collation order change system, the number of times a comparison and reference biometric data item is used in succession on an item-by-item and user-by-user basis; the number of times a comparison and reference biometric data item is used during a predetermined period on an item-by-item and user-by-user basis on condition that the predetermined period has passed; the number of times a comparison and reference biometric data item is used in succession during a time (time period) on an item-by-item, time-by-time, and user-by-user basis; and/or the number of times a comparison and reference biometric data item is used during a time (time period) within a predetermined period on an item-by-item, time-by-time, and user-by-user basis on condition that the predetermined period has passed. The number of times used in succession and the number of times used are cleared to zero in response to a change in the collation order.

In the case of using, as a collation order change system, the system of changing the collation order of comparison and reference biometric data to descending order of their numbers of times used during a predetermined period on a user-by-user basis on condition that the predetermined period has passed since the last change in the collation order, or the system of changing the collation order of comparison and reference biometric data to descending order of their numbers of times used during a time (time period) in a predetermined period on a time-by-time and user-by-user basis on condition that the predetermined period has passed since the last change in the collation order, the collation order change determination period definition part 209 retains the predetermined period (collation order change determination period). The predetermined period is determined by an administrator.

In the case of using, as a collation order change system, the system of changing the place (priority) of the comparison and reference biometric data of a living body part whose number of times used in succession exceeds a predetermined number to first in the collation order on a user-by-user basis, or the system of changing the place (priority) of the comparison and reference biometric data of a living body part whose number of times used in succession during a time (time period) to first in the collation order for the time on a time-by-time and user-by-user basis, the successive use number definition part 210 retains the predetermined number, or a threshold. The threshold may be a preset fixed value or may be determined (set) by an administrator. With respect to this threshold, the defined value varies depending on how often a user goes through authentication. If authentication is conducted twice or so a day, for example, at the beginning and end of work as in attendance management, it is desirable that the threshold be set to a small value such as five. On the other hand, in the case where authentication is frequently performed in unlocking a screen saver or logging onto applications, it is desirable that the threshold be a little larger than that in attendance management, such as ten or so. The threshold is not determined in a single uniform way by the frequency of use of authentication, and may be determined by a system administrator based on the condition of operation.

The collation order change determination part 211 has the function of determining whether to change the collation order based on whether it has been determined that a user has steadied at a change of a living body part to use for authentication, referring to the usage state retention part 208, in accordance with the collation order change system. The collation order change determination part 211 includes a successive use number/use number clearance part 211a configured to clear the number of times used in succession or the number of times used retained in the usage state retention part 208 in response to the determination that the collation order be changed.

The collation order change system determination part 212 has the function of determining the collation order change system in the case where the system has multiple collation order change systems. The collation order change system determination part 212 includes a collation order change system definition part 212a configured to retain a collation order change system preselected by an administrator. Modes corresponding to individual collation order change systems are predefined in the server 2. The collation order change system determination part 212 sets the mode of the determined collation order change system, so that the collation order change determination part 211 and the collation order change part 213 perform processing corresponding to the mode. Further, if the number of system users is less than a predetermined number, the collation order change system determination part 212 does not change the collation order, and may prevent the determination process in the collation order change determination part 211 and the change process in the collation order change part 213 from being performed. In this case, a flag that indicates whether to change the collation order is defined (with FALSE meaning "not to change the collation order and TRUE meaning "to change the collation order"). The collation order change system determination part 212 determines whether the number of system users is less than a predetermined number by counting the number of IDs in the comparison and reference biometric data retention part 202, and sets the flag in accordance with the result of the determination. The collation order change determination part 211 and the collation order change part 213 do not perform processing if the flag is FALSE, and perform processing if the flag is TRUE. In the case where the number of system users is less than a predetermined number, the amount of time for collation is not much affected by not considering the collation order. Therefore, further reduction in time can be achieved by eliminating the time for changing the collation order.

The collation order change part 213 has the function of changing the collation order retained in the collation order retention part 205 in accordance with the collation order change system if the collation order change determination part 211 determines that the collation order be changed.

The authentication result returning part 214 has the function of returning the result of authentication (success/failure) by the collation conducted in the biometric data comparison and reference part 207 to the client 1. The authentication result returning part 214 includes an authentication result encryption part 214a configured to encrypt communication data including the authentication result. The communication data including the authentication result are encrypted in order to prevent cheating with fake communication data, because coming to and leaving work is registered in accordance with the authentication result. The server 2 further includes a control part 220 such as a processor or a central processing unit (CPU) that implements and controls the operations of the above-described parts 201 through 214 by executing a program installed in the server 2.

Figure 2:
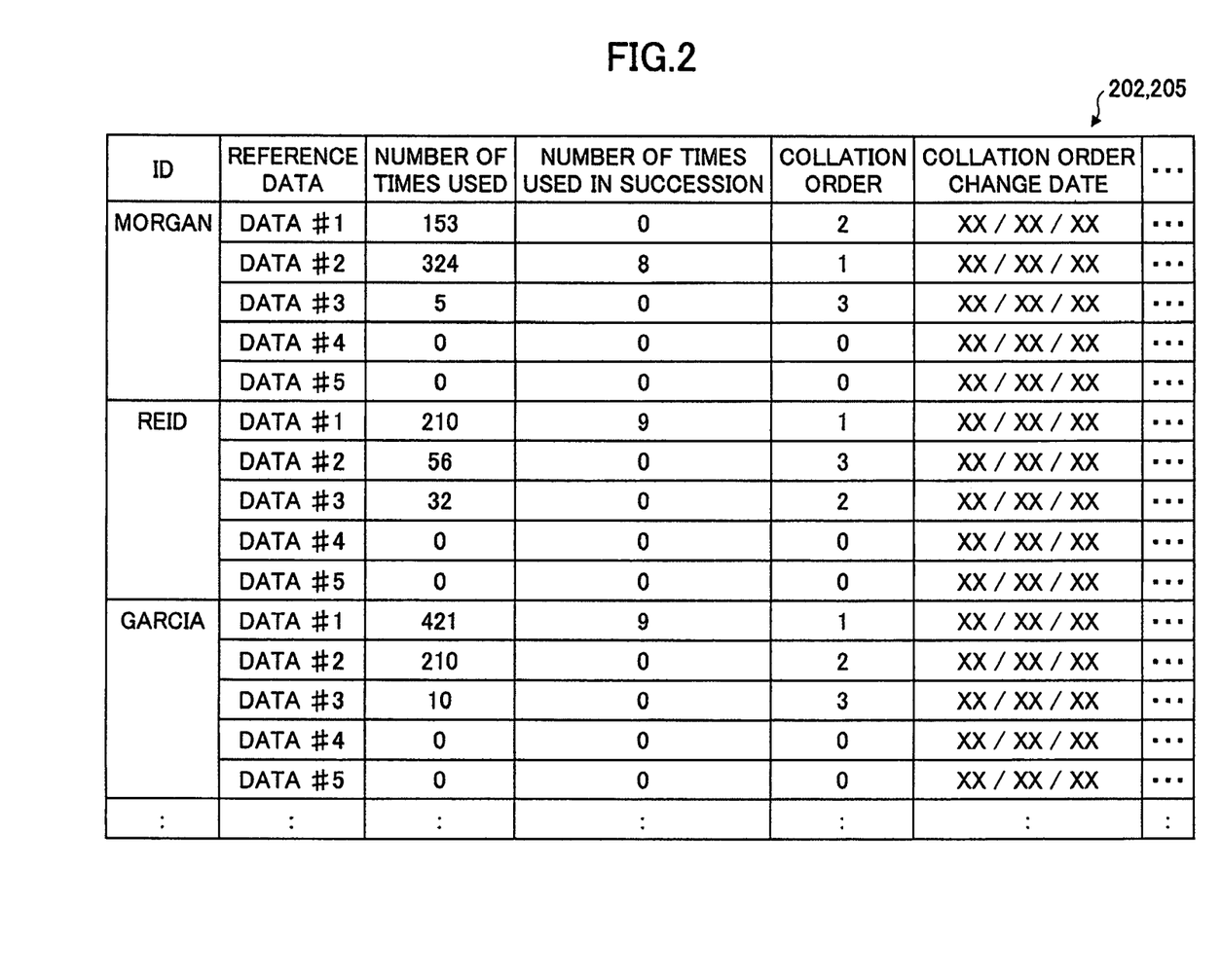
FIG. 2 illustrates a data structure of a comparison and reference biometric data retention part and a collation order retention part according to the embodiment.
Figure 3:
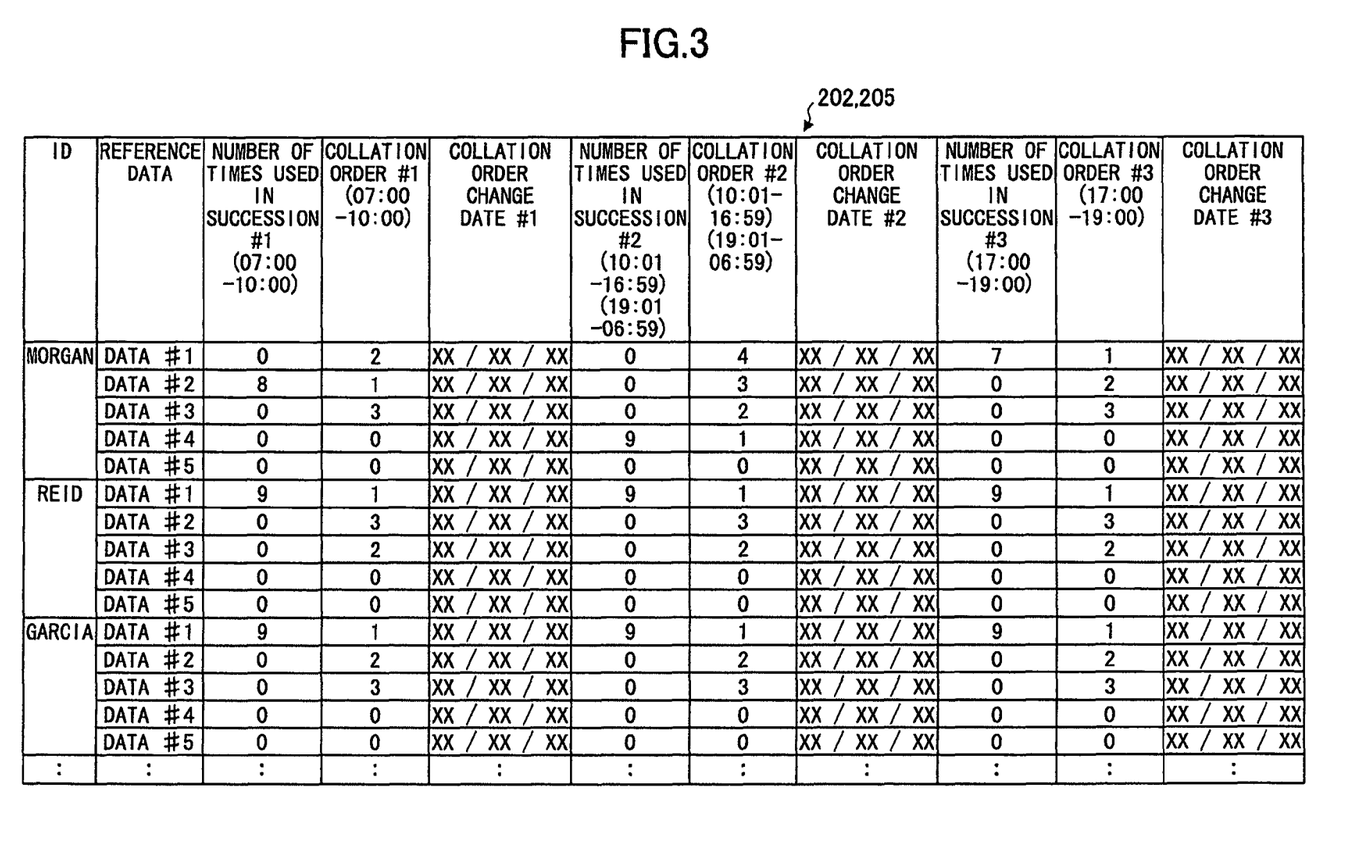
FIG. 3 illustrates another data structure of the comparison and reference biometric data retention part and the collation order retention part according to the embodiment.

FIG. 2 and FIG. 3 illustrate data structures of the comparison and reference biometric data retention part 202 and the collation order retention part 205. The comparison and reference biometric data retention part 202 and the collation order retention part 205 are implemented with a single table in this embodiment, but may be configured separately with respective tables.

FIG. 2 illustrates a case of using, as a collation order change system, the system of changing the place (priority) of the comparison and reference biometric data of a living body part whose number of times used in succession exceeds a predetermined number to first in the collation order on a user-by-user basis, or the system of changing the collation order of comparison and reference biometric data to descending order of their numbers of times used during a predetermined period on a user-by-user basis on condition that the predetermined period has passed since the last change in the collation order. That is, the table of FIG. 2 includes the items of ID for identifying a user, REFERENCE DATA that are the comparison and reference biometric data of the user, NUMBER OF TIMES USED of the comparison and reference biometric data on a predetermined-period basis (predetermined period by predetermined period), NUMBER OF TIMES USED IN SUCCESSION of the comparison and reference biometric data, COLLATION ORDER (collation priorities) of the comparison and reference biometric data, and COLLATION ORDER CHANGE DATE that is the date of the change of the collation order. The initial value of COLLATION ORDER is zero (0), and the value is set (determined) by the below-described collation order change process. Therefore, with respect to a comparison and reference biometric data item that has been registered but remains unused, the value of COLLATION ORDER remains the initial value of 0 without being updated. Further, it is assumed that the comparison and reference biometric data are biometric data such as fingerprints or finger veins acquired from five of the ten fingers of both hands.

FIG. 3 illustrates a case of using, as a collation order change system, the system of changing the place (priority) of the comparison and reference biometric data of a living body part whose number of times used in succession during a time (time period) to first in the collation order for the time on a time-by-time and user-by-user basis. That is, the table of FIG. 3 includes the items of ID for identifying a user, REFERENCE DATA that are the comparison and reference biometric data of the user, NUMBER OF TIMES USED IN SUCCESSION #1 of the comparison and reference biometric data in a first time (time period), COLLATION ORDER (collation priorities) #1 of the comparison and reference biometric data in the first time, COLLATION ORDER CHANGE DATE #1 that is the date of the change of the collation order, NUMBER OF TIMES USED IN SUCCESSION #2 of the comparison and reference biometric data in a second time (time period), COLLATION ORDER (collation priorities) #2 of the comparison and reference biometric data in the second time, COLLATION ORDER CHANGE DATE #2 that is the date of the change of the collation order, NUMBER OF TIMES USED IN SUCCESSION #3 of the comparison and reference biometric data in a third time (time period), COLLATION ORDER (collation priorities) #3 of the comparison and reference biometric data in the third time, and COLLATION ORDER CHANGE DATE #3 that is the date of the change of the collation order. Here, a day is divided into three time groups, but time may be divided as desired depending on conditions. That is, how to divide managed time is determined under the operating conditions of the system and is not limited to a particular division method. Here, by way of example, the time of a day is managed by dividing 24 hours into three time groups: 7:00 to 10:00, considered a time period when many come to work; 17:00 to 19:00, considered a time period when many leave work; and other time periods of 10:00 to 16:59 and 19:01 to 6:59. The 7:00 to 10:00 time period and the 17:00 to 19:00 time period may be grouped into one if the same sensor is used. However, these time periods are managed separately in this embodiment because a user may use different hands for operations since the user may face the sensor at different positions at the time of entering the office and at the time of leaving the office, for example.

Further, in the case of using the system of changing the collation order of comparison and reference biometric data to descending order of their numbers of times used during a time (time period) in a predetermined period on a time-by-time and user-by-user basis on condition that the predetermined period has passed since the last change in the collation order, NUMBER OF TIMES USED IN SUCCESSION #1, NUMBER OF TIMES USED IN SUCCESSION #2, and NUMBER OF TIMES USED IN SUCCESSION #3 in FIG. 3 may be replaced with NUMBER OF TIMES USED #1, NUMBER OF TIMES USED #2, and NUMBER OF TIMES USED #3, respectively, on a predetermined-period basis.

[Operations]

Figure 4:
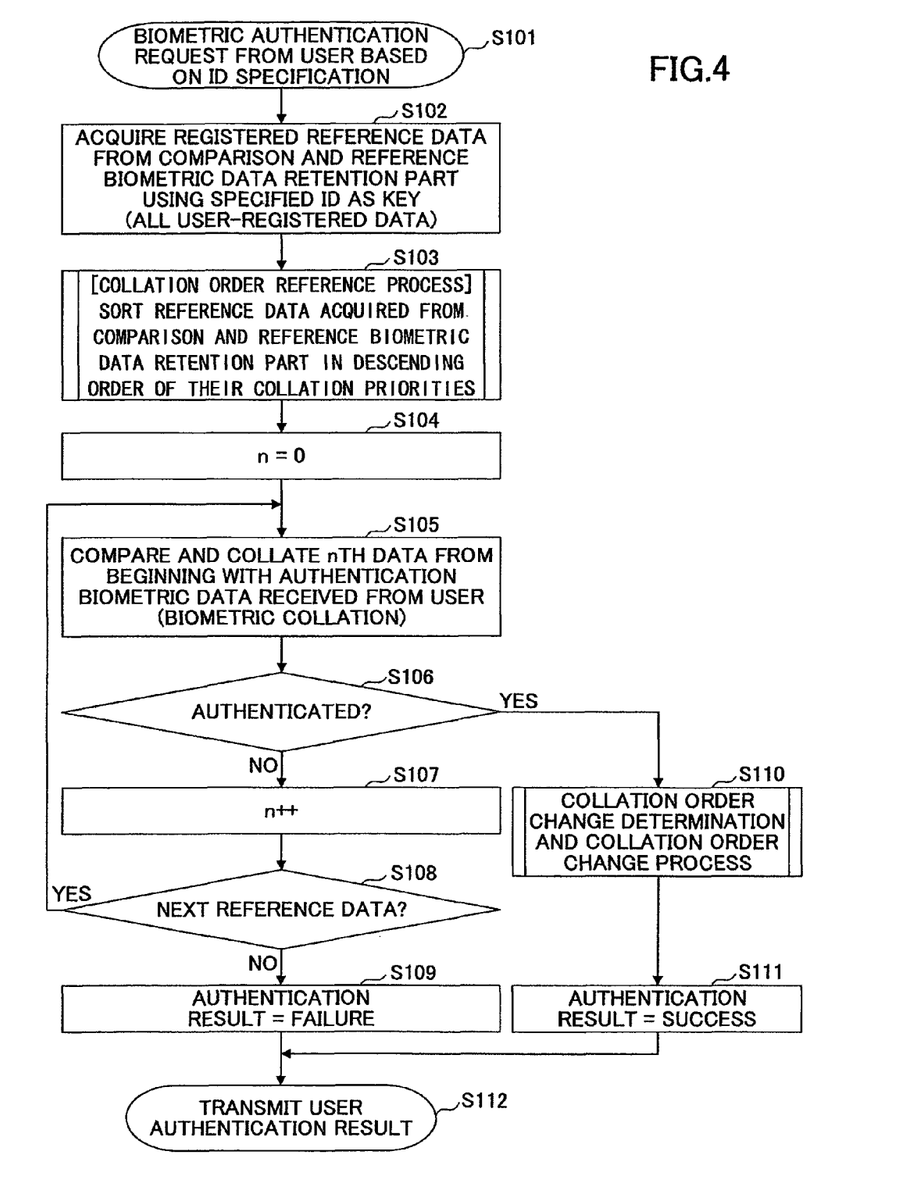
FIG. 4 is a flowchart illustrating processing according to the embodiment.

FIG. 4 is a flowchart illustrating processing according to this embodiment.

Referring to FIG. 4, in step S101, the server 2 starts processing in response to a user requesting biometric authentication by specifying her/his ID. Then, in step S2, the comparison and reference biometric data acquisition part 203 acquires registered reference data (comparison and reference biometric data) from the comparison and reference biometric data retention part 202 using the ID as a key. Although not graphically illustrated, if no reference data corresponding to the specified ID are obtained, the processing ends as authentication failure.

Next, in step S103, as a collation order reference process, the collation order reference part 206 refers to a collation order in the collation order retention part 205 or the default collation order definition part 204, and sorts the reference data acquired from the comparison and reference biometric data retention part 202 in descending order of collation priorities. As to whether to acquire a collation order from the collation order retention part 205 or the default collation order definition part 204, first, a collation order is acquired from the collation order retention part 205. If all of the values of the acquired collation order are initial values of 0, then, a collation order is acquired from the default collation order definition part 204. Even if all of the values of the collation order acquired from the collation order retention part 204 are not initial values of 0, the collation order in the default collation order definition part 204 may also be acquired, so that an overall collation order (overall collation priorities) may be determined by taking both collation orders into consideration. Further, a collation order corresponding to a time (time period) to which current time belongs is used in the case of using, as a collation order change system, the system of changing the place (priority) of the comparison and reference biometric data of a living body part whose number of times used in succession during a time (time period) to first in the collation order for the time on a time-by-time and user-by-user basis, or the system of changing the collation order of comparison and reference biometric data to descending order of their numbers of times used during a time (time period) in a predetermined period on a time-by-time and user-by-user basis on condition that the predetermined period has passed since the last change in the collation order.

Next, in step S104, a variable n is set to zero (0). Then, in step S105, the biometric data comparison and reference part 207 compares and collates the authentication biometric data received from the user with the nth reference data item from the beginning of the sorted reference data (items). Then, in step S106, the biometric data comparison and reference part 207 determines whether the user has been authenticated by exceeding a predetermined match rate. Various biometric data comparison and collation systems have been devised, and any biometric authentication system may be used.

If the user has not been authenticated (NO in step S106), in step S107, the variable n is incremented (by one), and in step S108, it is determined whether there is a subsequent reference data item. If there is a subsequent reference data item (YES in step S108), the processing returns to step S105 where comparison and collation with the nth reference data item is performed. If there is no subsequent reference data item (NO in step S108), in step S109, it is determined that the authentication result is a failure, and in step S112, the authentication result returning part 214 notifies the client 1 of the authentication result, and the processing ends.

On the other hand, if the user has been authenticated (YES in step S106), in step S110, a collation order change determination and collation order change process by the collation order change determination part 211 and/or the collation order change part 213 is performed. A description is given below of the details of the process of step S110. Then, in step S111, it is determined that the authentication result is a success, and in step S112, the authentication result returning part 214 notifies the client 1 of the authentication result, and the processing ends.

Figure 5:
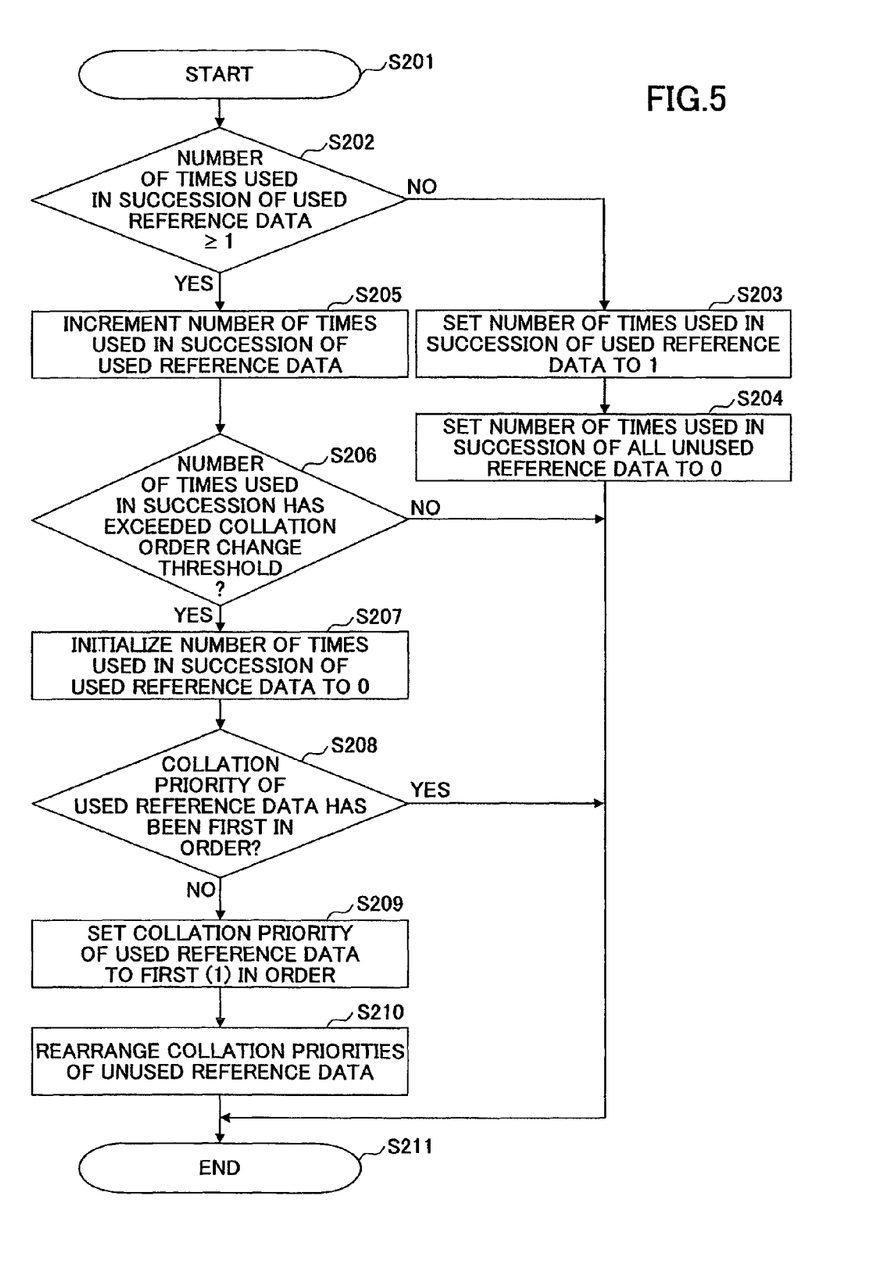
FIG. 5 is a flowchart illustrating an example of a collation order change determination and collation order change process according to the embodiment.

FIG. 5 is a flowchart illustrating an example of the collation order change determination and collation order change process (step S110 of FIG. 4) in the case of using, as a collation order change system, the system of changing the place (priority) of the comparison and reference biometric data of a living body part whose number of times used in succession exceeds a predetermined number to first in the collation order on a user-by-user basis, or the system of changing the place (priority) of the comparison and reference biometric data of a living body part whose number of times used in succession during a time (time period) to first in the collation order for the time on a time-by-time and user-by-user basis.

Referring to FIG. 5, in step S201, the collation order change determination and collation order change process is started. Then, in step S202, it is determined whether the number of times used in succession of the reference data item used for the collation is more than or equal to one (1). That is, it is determined whether the reference data item used for the collation has been used last time (or in the last or previous collation).

If the number of times used in succession of the reference data item is not more than or equal to 1, that is, the number of times used in succession of the reference data item is 0 (NO in step S202), in step S203, the number of times used in succession of the reference data item is set to 1, and in step S204, the number of times used in succession of each of unused reference data items is set to 0. Then, in step S211, the processing ends.

If the number of times used in succession of the reference data item is more than or equal to 1 (YES in step S202), in step S205, the number of times used in succession of the reference data item is incremented.

Next, in step S206, it is determined whether the number of times used in succession of the reference data item has exceeded a collation order change threshold set in the successive use number definition part 210. If the number of times used in succession of the reference data item has not exceeded the collation order change threshold (NO in step S206), in step S211, the processing ends.

If the number of times used in succession of the reference data item has exceeded the collation order change threshold (YES in step S206), in step S207, the number of times used in succession of the reference data item used is initialized to 0 in order to newly determine the necessity of changing the collation order next time and thereafter.

Next, in step S208, it is determined whether the collation priority of the reference data used has been first in order. If the collation priority of the reference data used has been first in order (YES in step S208), in step S211, the processing ends. This is because if the collation priority has been first, the collation order (collation priority) may not be changed. Accordingly, if a user keeps on using the same living body part in succession, the processing is executed up to step S208, but its collation priority remains first without being changed.

If the collation priority of the reference data used has not been first in order (NO in step S208), in step S209, the collation priority of the reference data used is set to first (1), and in step S210, the collation priorities of unused reference data items are lowered in order. Then, in step S211, the processing ends. For example, the collation priority of a living body part that has been higher in collation order than the living body part whose collation priority has been set to first is lowered by one, and the collation priority of a living body part that has been lower in collation order than the living body part whose collation priority has been set to first is kept unchanged, thereby ending the processing.

In the case of using, as a collation order change system, the system of changing the place (priority) of the comparison and reference biometric data of a living body part whose number of times used in succession during a time (time period) to first in the collation order for the time on a time-by-time and user-by-user basis, the number of times used in succession and the collation order (collation priority) in the above-described process are those corresponding to a time (time period) to which current time belongs. The time information output by a built-in clock of the server 2 may be obtained as current time via the operating system.

Figure 6:
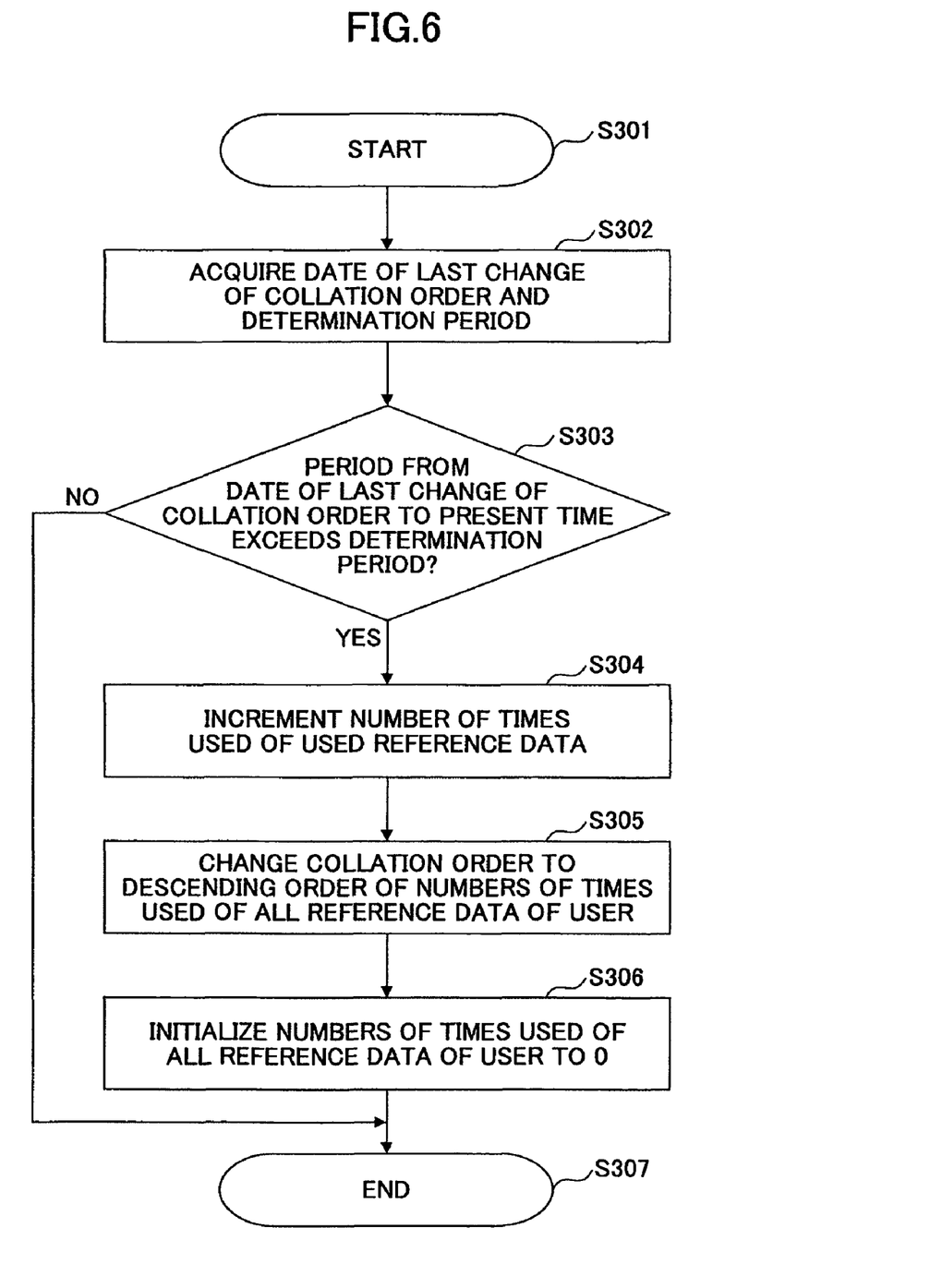
FIG. 6 is a flowchart illustrating another example of the collation order change determination and collation order change process according to the embodiment.

FIG. 6 is a flowchart illustrating an example of the collation order change determination and collation order change process (step S110 of FIG. 4) in the case of using, as a collation order change system, the system of changing the collation order of comparison and reference biometric data to descending order of their numbers of times used during a predetermined period on a user-by-user basis on condition that the predetermined period has passed since the last change in the collation order, or the system of changing the collation order of comparison and reference biometric data to descending order of their numbers of times used during a time (time period) in a predetermined period on a time-by-time and user-by-user basis on condition that the predetermined period has passed since the last change in the collation order.

Referring to FIG. 6, in step S301, the collation order change determination and collation order change process is started. Then, in step S302, the date of the last change of the collation order and a determination period are acquired. Then, in step S303, it is determined whether the period from the date of the last change of the collation order up to present time exceeds the determination period. The time information output by a built-in clock of the server 2 may be obtained as the date of present time via the operating system. If the period from the date of the last change of the collation order up to present time does not exceed the determination period (NO in step S303), in step S307, the processing ends.

If the period from the date of the last change of the collation order up to present time exceeds the determination period (YES in step S303), in step S304, the number of times used of the reference data used is incremented. Then, in step S305, the collation order of all the reference data of the user is changed to descending order of their numbers of times used. That is, the collation priorities of all the reference data items of the user are rearranged in descending order of their numbers of times used. Then, in step S306, the numbers of times used of all the reference data (items) of the user are initialized to 0, and in step S307, the processing ends.

In the case of using, as a collation order change system, the system of changing the collation order of comparison and reference biometric data to descending order of their numbers of times used during a time (time period) in a predetermined period on a time-by-time and user-by-user basis on condition that the predetermined period has passed since the last change in the collation order, the date of the last change of the collation order, the number of times used, and the collation order (collation priorities) in the above-described process are those corresponding to a time (time period) to which current time belongs.

As described above, according to one aspect of this embodiment, the weighting of priorities is flexibly changed or updated in response to a user having steadied at a change of her/his living body part to use for authentication based on the user's usage conditions. This eliminates unnecessary collation so as to enable high-speed processing, thus enabling even systems that perform biometric authentication on a large number of people to operate with efficiency. That is, if a user changes her/his body part for authentication because of a change of a sensor place or an injury to her/his finger, the user primarily uses a new body part for authentication after the change. By changing the collation order by detecting such changes one after another, it is possible to respond immediately to a change in the situation. Accordingly, compared with the conventional prioritization based on the number of successful authentications, it is possible to elevate the priority of the primarily used part within a short period of time, and to eliminate unnecessary collation early.

According to one aspect of this embodiment, since a process is simple, there is no increase in apparatus cost.

According to one aspect of this embodiment, the number of times used in succession or the number of times used within a period exceeding a predetermined period of comparison and reference biometric data of successful authentication may be subjected to determination. This facilitates detection of a user having steadied at a change of her/his living body part to use for authentication.

According to one aspect of this embodiment, the usage conditions of a user may be managed on a time (time period) basis. As a result, it is possible to provide efficient system operations without unnecessary collation also in the case where the same user goes through authentication using different living body parts in different usage environments. Further, employment of this method also makes it possible to define (determine) at which time which biometric authentication method is used in not only biometric authentication systems with a single method (system) but also biometric authentication systems adopting multiple biometric authentication methods (systems) using, for example, fingerprints, an iris, and veins.

According to one aspect of this embodiment, a collation order change method (system) corresponding to the operation of the system is selectable from multiple collation order change methods provided. This makes it possible to cause the system to respond flexibly to usage by users.

According to one aspect of this embodiment, whether to change a collation order may be determined based on the number of registered users. This makes it possible to cause a collation order change process to run if there is an increase in the number of people to be processed and not to run if the number of people is not so large that the collation order change process is unnecessary. Thus, it is possible to cause the system to respond flexibly to usage by users.

According to one aspect of this embodiment, a default collation order may be defined (determined). This makes it possible for the system to reduce time before setting a valid collation order to some extent.

According to one aspect of this embodiment, communication data or the contents of communications (such as IDs, authentication biometric data, and authentication results) may be encrypted. This makes it possible to maintain security and prevent cheating such as masquerading.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

What is claimed is:

1. A biometric authentication apparatus, comprising:
a data retention part configured to retain a plurality of first biometric data items extracted from a plurality of living body parts of a user to be authenticated in correlation with a collation order of the first biometric data items;
a collation part configured to acquire a second biometric data item from the user, to compare and collate the acquired second biometric data item with the first biometric data items in a descending order of collation priorities of the first biometric data items based on the collation order, and to determine that the user has been successfully authenticated in response to detecting one of the first biometric data items whose match rate with the second biometric data item exceeds a predetermined value; and
a collation order change part configured to change the collation order in response to detecting, from a state of usage of the one of the first biometric data items used in the successful authentication, that the user has steadied at a change of a living body part thereof to use for authentication.

2. The biometric authentication apparatus as claimed in claim 1, wherein the collation order change part is configured to count a number of times used in succession of the one of the first biometric data items and change the collation priority of the one of the first biometric data items to first in the collation order in response to the counted number of times exceeding a predetermined value.

3. The biometric authentication apparatus as claimed in claim 1, wherein the collation order change part is configured to count a number of times used of the one of the first biometric data items during a predetermined period and change the collation order to a descending order of the numbers of times used of the first biometric data items at every passage of the predetermined period.

4. The biometric authentication apparatus as claimed in claim 1, wherein the collation order change part is configured to count a number of times used in succession of the one of the first biometric data items during a time and change the collation priority of the one of the first biometric data items to first in the collation order for the time in response to the counted number of times exceeding a predetermined value.

5. The biometric authentication apparatus as claimed in claim 1, wherein the collation order change part is configured to count a number of times used of the one of the first biometric data items during a time within a predetermined period and change the collation order for the time to a descending order of the numbers of times used of the first biometric data items at every passage of the predetermined period.

6. The biometric authentication apparatus as claimed in claim 1, wherein the collation order change part is configured to support a plurality of collation order change systems and determine one of the collation order change systems as a collation order change system to use in accordance with a setup by an administrator.

7. The biometric authentication apparatus as claimed in claim 1, wherein the collation order change part is configured to keep the collation order unchanged if a number of users to be authenticated is less than a predetermined value.

8. The biometric authentication apparatus as claimed in claim 1, wherein the collation part is configured to compare and collate the acquired second biometric data item with the first biometric data items in the descending order of the collation priorities of the first biometric data items based on a preset default collation order before the collation order becomes valid.

9. The biometric authentication apparatus as claimed in claim 1, further comprising:
an encryption part configured to encrypt the second biometric data item included in communication data to pass through a path through which the second biometric data item is acquired from the user at a time of the authentication.

10. The biometric authentication apparatus as claimed in claim 1, further comprising:
an encryption part configured to encrypt communication data to pass through a path through which the second biometric data item is acquired from the user at a time of the authentication.

11. The biometric authentication apparatus as claimed in claim 1, further comprising:
an encryption part configured to encrypt communication data to pass through a path for transmitting a result of the authentication.

12. A biometric authentication control method, comprising:
retaining a plurality of first biometric data items extracted from a plurality of living body parts of a user to be authenticated in correlation with a collation order of the first biometric data items;
acquiring a second biometric data item from the user;
comparing and collating the acquired second biometric data item with the first biometric data items in a descending order of collation priorities of the first biometric data items based on the collation order;
determining that the user has been successfully authenticated in response to detecting one of the first biometric data items whose match rate with the second biometric data item exceeds a predetermined value; and
changing the collation order in response to detecting, from a state of usage of the one of the first biometric data items used in the successful authentication, that the user has steadied at a change of a living body part thereof to use for authentication.

13. The biometric authentication control method as claimed in claim 12, wherein said changing counts a number of times used in succession of the one of the first biometric data items and changes the collation priority of the one of the first biometric data items to first in the collation order in response to the counted number of times exceeding a predetermined value.

14. The biometric authentication control method as claimed in claim 12, wherein said changing counts a number of times used of the one of the first biometric data items during a predetermined period and changes the collation order to a descending order of the numbers of times used of the first biometric data items at every passage of the predetermined period.

15. The biometric authentication control method as claimed in claim 12, wherein said changing counts a number of times used in succession of the one of the first biometric data items during a time and changes the collation priority of the one of the first biometric data items to first in the collation order for the time in response to the counted number of times exceeding a predetermined value.

16. The biometric authentication control method as claimed in claim 12, wherein said changing counts a number of times used of the one of the first biometric data items during a time within a predetermined period and changes the collation order for the time to a descending order of the numbers of times used of the first biometric data items at every passage of the predetermined period.

17. The biometric authentication control method as claimed in claim 12, wherein said changing supports a plurality of collation order change systems and determines one of the collation order change systems as a collation order change system to use in accordance with a setup by an administrator.

18. The biometric authentication control method as claimed in claim 12, wherein the collation order is kept unchanged if a number of users to be authenticated is less than a predetermined value.

19. The biometric authentication control method as claimed in claim 12, wherein said comparing and collating compares and collates the acquired second biometric data item with the first biometric data items in the descending order of the collation priorities of the first biometric data items based on a preset default collation order before the collation order becomes valid.

* * * * *